United States Patent
Min et al.

(10) Patent No.: US 10,180,561 B2
(45) Date of Patent: Jan. 15, 2019

(54) CAMERA MODULE

(71) Applicant: LG Innotek Co., Ltd., Seoul (KR)

(72) Inventors: Sang Jun Min, Seoul (KR); Hyune O Yoo, Seoul (KR); Sung Guk Lee, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 14/904,602

(22) PCT Filed: Jul. 11, 2014

(86) PCT No.: PCT/KR2014/006238
§ 371 (c)(1),
(2) Date: Jan. 12, 2016

(87) PCT Pub. No.: WO2015/005713
PCT Pub. Date: Jan. 15, 2015

(65) Prior Publication Data
US 2016/0154205 A1    Jun. 2, 2016

(30) Foreign Application Priority Data

Jul. 12, 2013   (KR) .................. 10-2013-0081956

(51) Int. Cl.
*G02B 7/09*   (2006.01)
*G02B 7/28*   (2006.01)
(Continued)

(52) U.S. Cl.
CPC ............... *G02B 7/28* (2013.01); *G02B 7/09* (2013.01); *G02B 27/0006* (2013.01); *G03B 3/10* (2013.01);
(Continued)

(58) Field of Classification Search
CPC .......... G02B 27/646; G02B 7/08; G02B 7/28; G02B 7/09; G03B 3/10; G03B 5/00;
(Continued)

(56) References Cited

U.S. PATENT DOCUMENTS 8,254,046 B2 * 8/2012 Lim .................. G02B 7/026
359/822
2010/0142063 A1 * 6/2010 Lam .................. G02B 27/62
359/824
(Continued)

FOREIGN PATENT DOCUMENTS

CN    101995637 A   3/2011
CN    202748519 U   2/2013
(Continued)

OTHER PUBLICATIONS

International Search Report in International Application No. PCT/KR2014/006238, filed Jul. 11, 2014.
(Continued)

*Primary Examiner* — Cara E Rakowski
(74) *Attorney, Agent, or Firm* — Saliwanchik, Lloyd & Eisenschenk

(57) ABSTRACT

A camera module may comprise: a printed circuit board on which an image sensor is mounted; a holder member disposed above the printed circuit board and having a plurality of magnets installed thereon; a bobbin installed on the inside of the holder member to be capable of moving along an optical axis, and having a coil unit installed on the outer peripheral surface thereof to be capable of electrically interacting with the magnets; a plurality of receptacles formed in the peripheral surface of the bobbin to form spaces that are separated from the coil unit; and a cover member having a plurality of integrally formed inner yokes, which are formed at positions corresponding to the plurality of receptacles and have a surface on one side thereof separated (Continued)

a certain distance from the coil unit and a surface on the other side thereof separated a certain distance from the bobbin.

20 Claims, 6 Drawing Sheets

(51) Int. Cl.
    *G03B 3/10*     (2006.01)
    *G03B 5/00*     (2006.01)
    *G02B 27/00*     (2006.01)
    *G03B 13/36*     (2006.01)
    *G03B 17/02*     (2006.01)
    *H04N 5/225*     (2006.01)

(52) U.S. Cl.
    CPC .............. *G03B 5/00* (2013.01); *G03B 13/36* (2013.01); *G03B 17/02* (2013.01); *H04N 5/2257* (2013.01); *G03B 2205/0007* (2013.01); *G03B 2205/0069* (2013.01)

(58) Field of Classification Search
    CPC ............................... G03B 13/36; G03B 17/02; G03B 2205/0007; G03B 2205/0046; G03B 2205/0053; G03B 2205/0069; H04N 5/2251–5/2254; H04N 5/2257
    See application file for complete search history.

(56) References Cited

U.S. PATENT DOCUMENTS

| | | | |
|---|---|---|---|
| 2010/0149666 A1* | 6/2010 | Liao | H02K 41/0356 359/824 |
| 2011/0044679 A1* | 2/2011 | Yoshida | G02B 7/08 396/133 |
| 2011/0121666 A1* | 5/2011 | Park | H02K 41/0356 310/15 |
| 2011/0310501 A1* | 12/2011 | Min | G02B 7/022 359/824 |
| 2012/0025633 A1* | 2/2012 | Lee | H02K 41/0356 310/12.16 |
| 2012/0147258 A1 | 6/2012 | Park | |
| 2013/0194490 A1* | 8/2013 | Okuyama | G02B 7/08 348/374 |
| 2014/0340775 A1* | 11/2014 | Hsu | H04M 1/0264 359/824 |
| 2015/0195438 A1* | 7/2015 | Park | H04N 5/2253 348/345 |
| 2015/0261067 A1* | 9/2015 | Jung | G03B 13/36 348/208.1 |
| 2017/0017056 A1* | 1/2017 | Park | G02B 7/08 |
| 2017/0094176 A1* | 3/2017 | Jung | H04N 5/23287 |

FOREIGN PATENT DOCUMENTS

| | | | | |
|---|---|---|---|---|
| JP | 2007-121848 A | | 5/2007 | |
| KR | 1020120045846 A | | 5/2012 | |
| KR | 1020120106017 A | | 9/2012 | |
| KR | 1020120117236 A | | 10/2012 | |
| KR | 1020130030062 A | | 3/2013 | |
| KR | 20130044503 A | * | 5/2013 | ......... H02K 41/0356 |

OTHER PUBLICATIONS

Office Action dated Feb. 24, 2018 in Chinese Application No. 201480035198.5.

* cited by examiner

CAMERA MODULE

CROSS-REFERENCE TO RELATED APPLICATION

This application is the U.S. national stage application of International Patent Application No. PCT/KR2014/006238, filed Jul. 11, 2014, which claims priority to Korean Application No. 10-2013-0081956, filed Jul. 12, 2013, the disclosures of each of which are incorporated herein by reference in their entirety.

BACKGROUND

Field of the Disclosure

The present disclosure relates to a camera module.

Discussion of the Related Art

A camera module may include an image sensor, an infrared cut-off filter configured to block light in infrared area from being incident on the image sensor, and an optical system formed of at least one lens configured to deliver an image to the image sensor.

Here, the optical system may be installed with an actuator module configured to perform auto focusing function and handshake compensation function.

The actuator module may be composed in various ways. In general, a voice coil motor is commonly used. The voice coil motor is driven by electromagnetic interaction between magnets fixed at a holder member and a coil unit wound on an outer circumferential surface of a bobbin, and may perform auto focusing function.

Generally, a yoke made of a major material of iron (Fe) that is a ferromagnetic body is provided in order to form a magnetic path of the magnet. Recently, a voice coil motor, without any separate yoke installed thereat, having an inner yoke integrally formed with a cover member such as a shield can made of iron (Fe) that is a ferromagnetic body at a position at which the yoke is to be installed, is also being developed.

Such voice coil motor having an inner yoke is advantageous in that the assembly of the camera module becomes convenient and the number of components can be reduced. However, when the length of the inner yoke is too short, the electromagnetic efficiency declines, an interference with an upper portion of the coil unit wound on an outer circumferential surface of the bobbin may occur during being driven, and foreign materials may be introduced.

In addition, when the length of the inner yoke is too long, the electromagnetic efficiency declines, as well as the verticality and concentricity becomes difficult to manage, thereby the manufacturability is degraded.

SUMMARY OF THE DISCLOSURE

According to an exemplary embodiment of the present disclosure, a camera module having an advanced structure so as to prevent introduction of foreign materials is provided, in consideration of the electromagnetic attribute.

In a general aspect of the present disclosure, there is provided a camera module, the camera module comprising: a PCB (Printed Circuit Board); a holder member arranged at an upper side of the PCB and installed with a plurality of magnets; a bobbin movably installed at an inner side of the holder member and installed with a coil unit facing the magnet at an outer circumferential surface of the bobbin; a plurality of accommodation grooves formed at a circumferential surface of the bobbin and being spaced from the coil unit at a predetermined interval to form a spaced portion; and a cover member integrally formed with a plurality of inner yokes formed by being bent at a position corresponding to that of the plurality of accommodation grooves, wherein one side surface of the inner yoke is spaced from the coil unit at a predetermined interval and another side surface of the inner yoke is spaced from the bobbin at a predetermined interval.

In some exemplary embodiments of the present disclosure, each of the inner yoke and the accommodation groove is formed at four edge portions of the cover member and the holder member, respectively.

In some exemplary embodiments of the present disclosure, the inner yoke may include: a connection portion connected to an upper portion of the cover member and formed by being bent in a round shape; and a pair of escape grooves symmetrically formed at a position adjacent to that of the connection portion.

In some exemplary embodiments of the present disclosure, the escape groove may have a length (L1) of 20-50% of an entire length (L2).

In some exemplary embodiments of the present disclosure, the escape groove may include a slanted surface having a predetermined angle.

In some exemplary embodiments of the present disclosure, an entire length (L2) of the inner yoke may be formed to be longer than a length (H1) from an upper surface of the cover member to an upper surface of the coil unit.

In some exemplary embodiments of the present disclosure, an entire length (L2) of the inner yoke may be 20-40% of an entire length (H) of the magnet.

In some exemplary embodiments of the present disclosure, a length (H2) of an end of the inner yoke overlapped with the coil unit by being inserted in the accommodation groove may be formed to be longer than a backstroke distance of the bobbin.

In some exemplary embodiments of the present disclosure, a surface of the inner yoke facing the bobbin may have a curvature corresponding to that of a virtual circle (a) concentric with the bobbin.

In some exemplary embodiments of the present disclosure, a surface of the inner yoke facing the bobbin may be provided in a flat and straight shape, and the inner yokes facing each other may be mutually parallel.

In some exemplary embodiments of the present disclosure, an angle (α) formed by the surface of the inner yoke facing the bobbin and a lateral surface of the cover member may be 45 degrees.

In some exemplary embodiments of the present disclosure, the holder member may include a plurality of magnet installation holes at four surfaces thereof for magnets of a same size to be inserted.

In some exemplary embodiments of the present disclosure, the cover member may be formed of a ferromagnetic body.

In some exemplary embodiments of the present disclosure, the bobbin may include a lens barrel installed inside with at least one lens.

In some exemplary embodiments of the present disclosure, the camera module may comprise: upper and lower elastic members respectively fixed at upper and lower portions of the holder member to elastically support upward and downward motions of the bobbin.

In some exemplary embodiments of the present disclosure, the coil unit may be a ring-shaped coil block coupled by being inserted in an outer circumferential surface of the bobbin.

In some exemplary embodiments of the present disclosure, the coil unit may include: a straight surface arranged at a position corresponding to that of the magnet; and a curved surface arranged at a position corresponding to that of the inner yoke and the accommodation groove.

In some exemplary embodiments of the present disclosure, the bobbin may include: a first surface flatly formed at a surface corresponding to the straight surface; and a second surface roundly formed at a surface corresponding to the curved surface.

In some exemplary embodiments of the present disclosure, the first surface may include: a protruded portion preventing the coil unit from departing in an optical axis direction.

In some exemplary embodiments of the present disclosure, the camera module may comprise: a base interposed between the PCB and the holder member and installed with an infrared cut-off filter.

According to an exemplary embodiment of the present disclosure, an interference between the inner yoke and the bobbin occurring when the auto focusing operation is being performed or a shaking of the bobbin occurs due to an external impact may be minimized, because an escape groove is formed at the inner yoke.

In addition, according to an exemplary embodiment of the present disclosure, foreign materials generated by motions of the bobbin or flowing down along the inner yoke may be collected by the grooved portion, because an end of the inner yoke is inserted in a grooved portion formed in an internal spaced portion of the coil unit wound on an outer circumferential surface of the bobbin.

In addition, according to an exemplary embodiment of the present disclosure, the voice coil motor may have optimal electromagnetic characteristic, because an entire length of the inner yoke is formed to be more than 20% of an entire length of the magnet.

DETAILED DESCRIPTION

Hereinafter, an exemplary embodiment of the present disclosure will be described with reference to the drawings.

Figure 1:
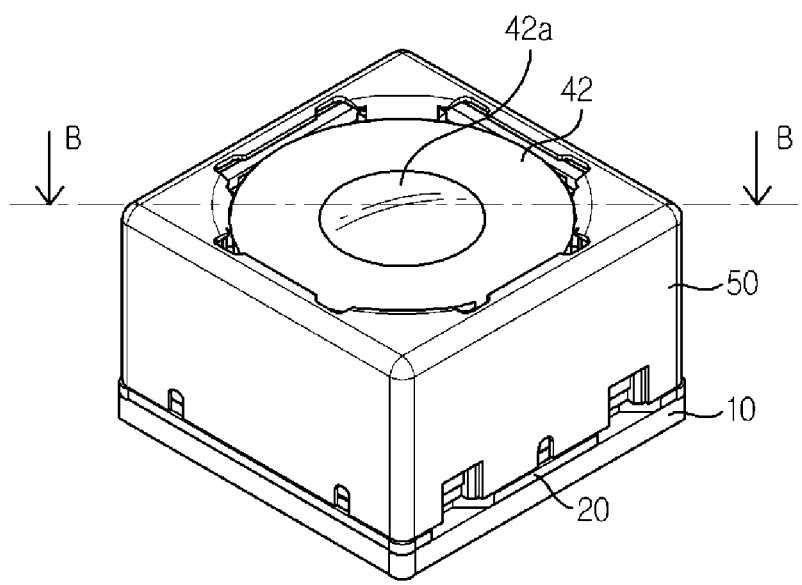
FIG. 1 is a perspective view illustrating an example of a camera module according to an exemplary embodiment of the present disclosure.
Figure 2:
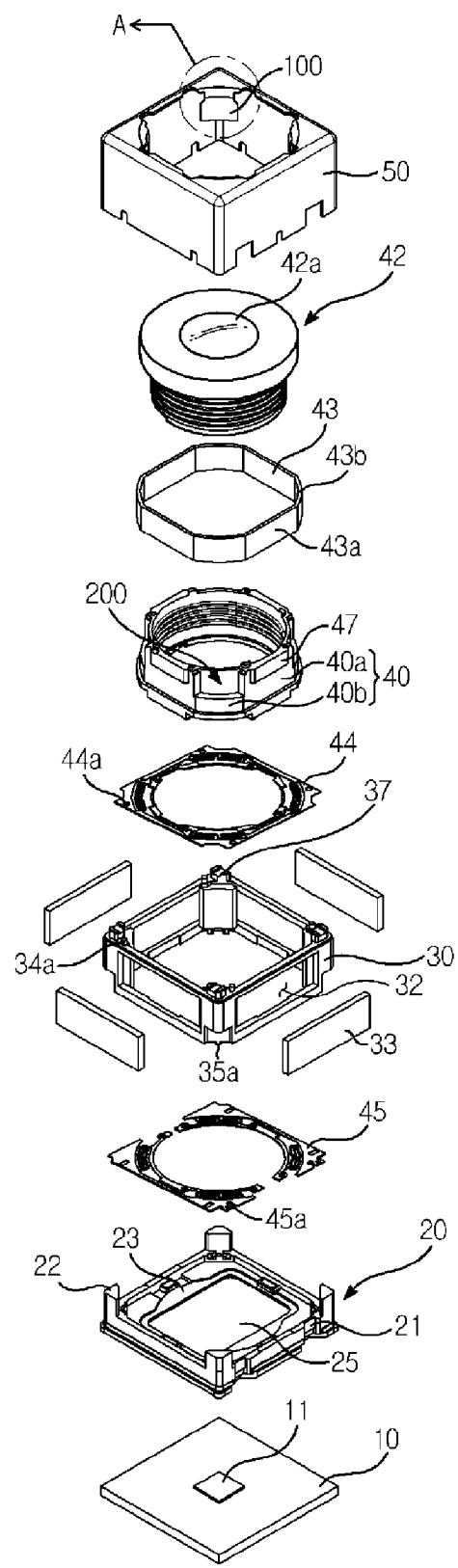
FIG. 2 is an exploded perspective view of FIG. 1.
Figure 3:
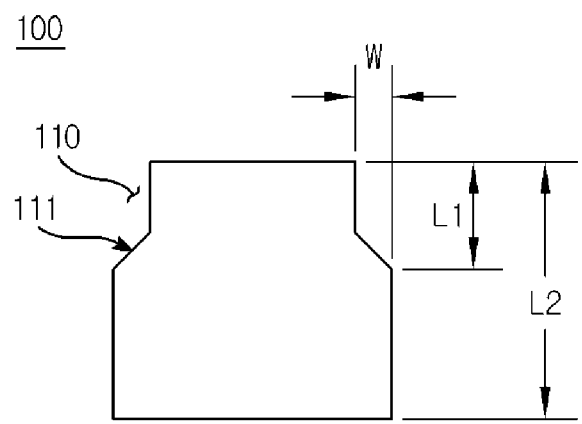
FIG. 3 is an enlarged view illustrating portion A of FIG. 2.
Figure 4:
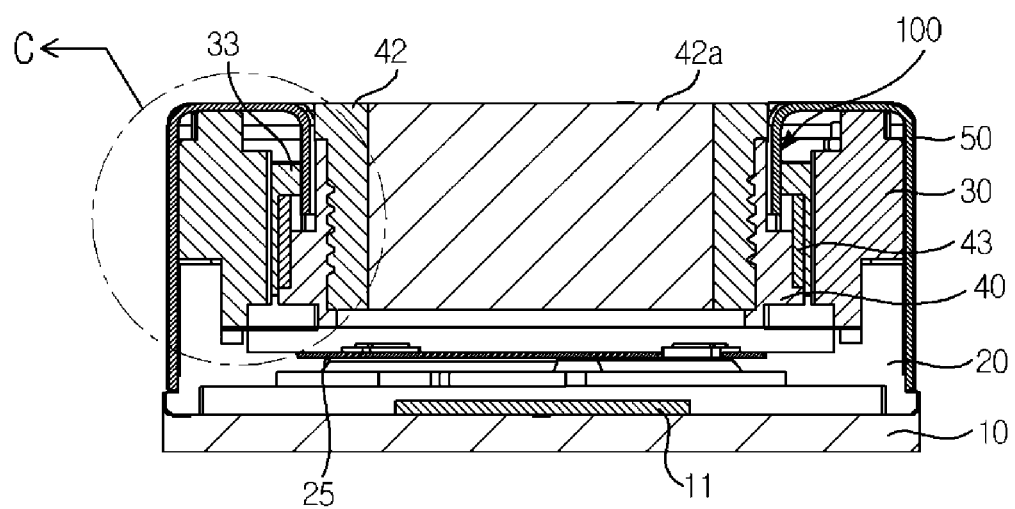
FIG. 4 is a B-B sectional view of FIG. 1.
Figure 5:
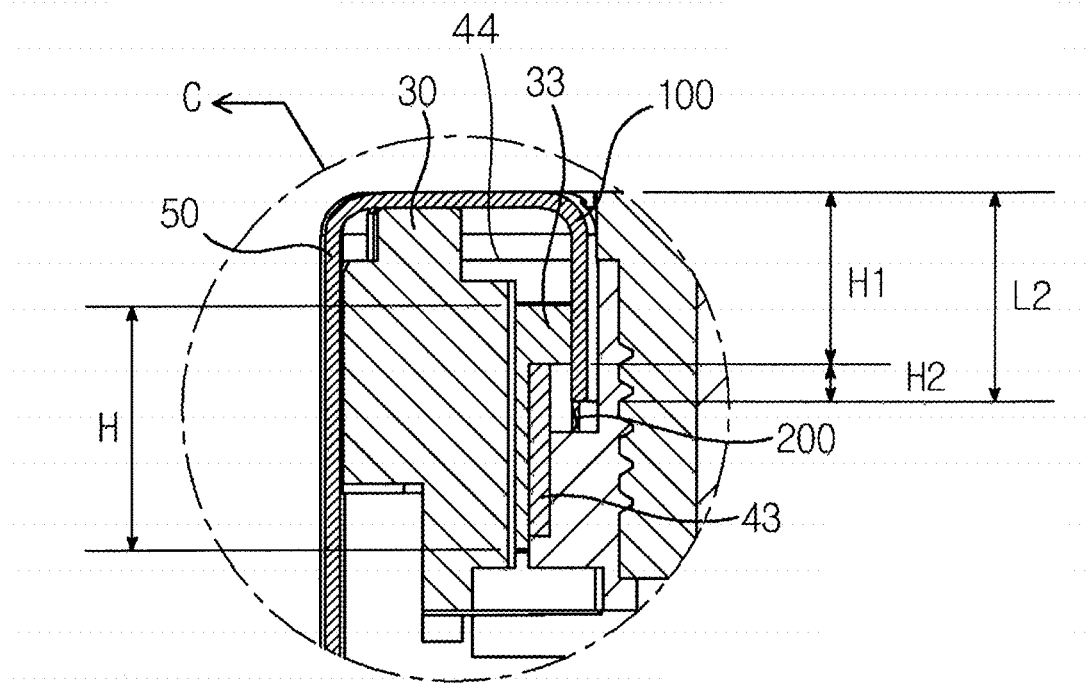
FIG. 5 is an enlarged view illustrating portion C of FIG. 4.
Figure 6:
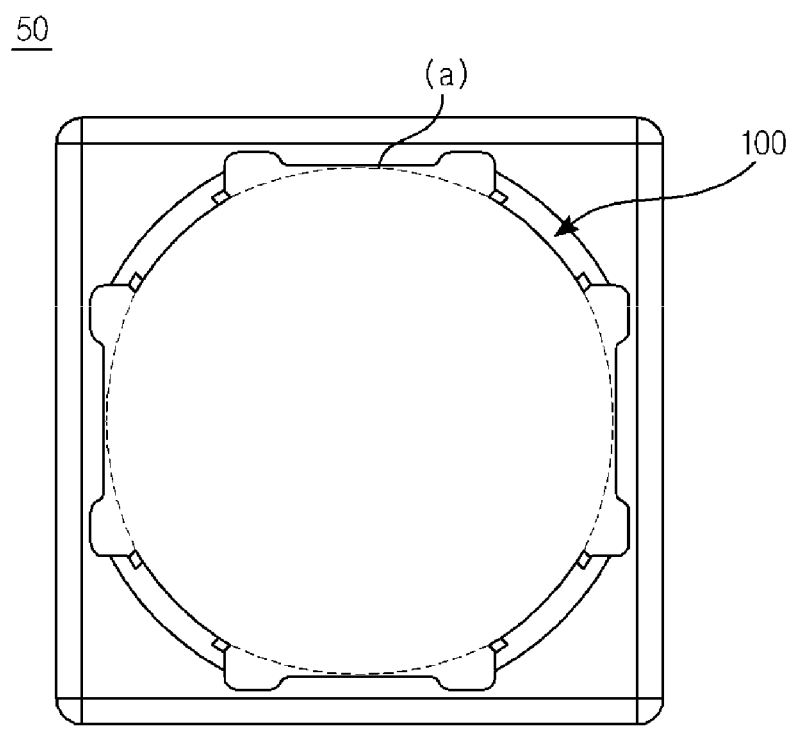
FIG. 6 is a plan view illustrating a cover member having an inner yoke according to a first exemplary embodiment of the present disclosure.
Figure 7:
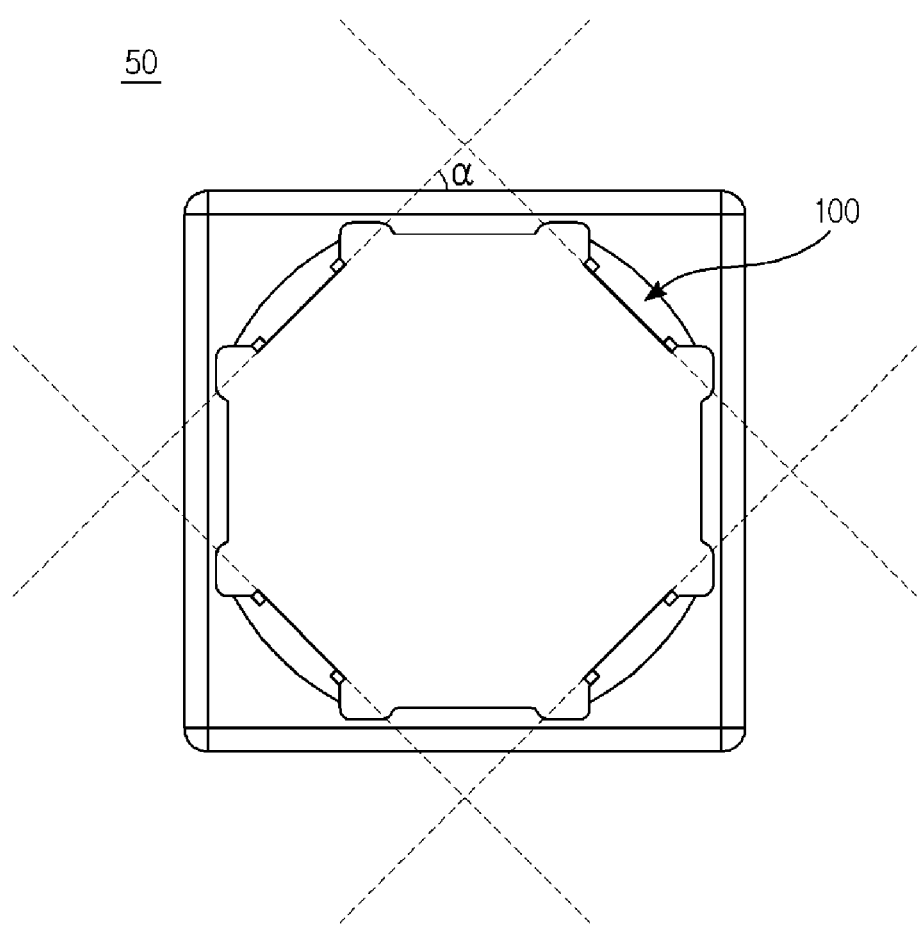
FIG. 7 is a plan view illustrating a cover member having an inner yoke according to a second exemplary embodiment of the present disclosure.

FIG. 1 is a perspective view illustrating an example of a camera module according to an exemplary embodiment of the present disclosure; FIG. 2 is an exploded perspective view of FIG. 1; FIG. 3 is an enlarged view illustrating portion A of FIG. 2; FIG. 4 is a B-B sectional view of FIG. 1; FIG. 5 is an enlarged view illustrating portion C of FIG. 4; FIG. 6 is a plan view illustrating a cover member having an inner yoke according to a first exemplary embodiment of the present disclosure; and FIG. 7 is a plan view illustrating a cover member having an inner yoke according to a second exemplary embodiment of the present disclosure.

As illustrated in FIGS. 1 and 2, a camera module according to an exemplary embodiment of the present disclosure may include a PCB (Printed Circuit Board) (10), a base (20), a holder member (30), a bobbin (40) and a cover member (50).

An image sensor (11) may be mounted at the PCB (10). The PCB (10) may form a bottom surface of the camera module. The image sensor (11) may be mounted at a center of an upper surface of the PCB (10), so as to be disposed with at least one lens (not illustrated) accommodated in the lens barrel (42) along an optical axis direction. The image sensor may convert an optical signal of an object that has been incident through the lens to an electrical signal.

The base (20) may include an infrared cut-off filter (25) installed at a position corresponding to that of the image sensor (11). In such case, the infrared cut-off filter (25) may be installed at a through-hole formed at a center of the based (20). Alternatively, a blue filter may be provided instead of the infrared cut-off filter. Here, the infrared cut-off filter (25) may be formed of, for example, a film material or a glass material. In addition, an infrared cut-off coating material may be arranged on a flat optical filter such as a cover glass for image plane protection, cover glass, etc.

A lower portion of the base (20) may be connected to the PCB (10), and an upper portion of the base (20) may support a bottom surface of the holder member (30) (to be described hereinafter). The base (20) may include a separate terminal member in order for electrical connection with the PCB (10). The terminal member may be provided as a separate member. Alternatively, the terminal member may be provided as a surface electrode formed on a surface of the base (20).

In addition, the base (20) may include at a lateral surface thereof an accommodation groove (21) to accommodate a terminal portion (not illustrated) electrically connected to the lower elastic member (45) or the coil unit (42). The terminal portion may be formed by being introduced at a lateral surface of the lower elastic member (45). In addition, the accommodation groove (21) may gradually form a right angle or an acute angel along a downward direction, so as to correspond to a bent angle of the terminal portion.

In addition, the base (20) may include at least one fixing protrusion (22) formed by being protruded at an upper edge of the base (20) to have a surface-to-surface contact with or be coupled to an internal lateral surface of the cover member (50). The fixing protrusion (22) may guide the cover member (50) to be readily coupled as well as may facilitate concrete fixation after the coupling.

In addition, a recessed portion (23) may be formed by being recessed at a center of the base (20) so that the bobbin (210) can be disposed by being spaced.

In addition, the base (20) is not an essential structure for the present disclosure. Therefore, although not illustrated in the drawings, the holder member (30) may be configured to perform a function of the base (20).

The holder member (30) may be formed in a broadly quadrangular shape, and may include a plurality of magnet installation holes (32) at each of four surfaces of the holder member (30), so that a plurality of magnets (33) can be installed at the magnet installation holes (32). As illustrated in the drawings, the magnet installation hole (32) may be formed at a lateral surface of the holder member (30). Alternatively, the magnet installation hole (32) may be formed at each edge of the holder member (30). In addition, the holder member (30) may be formed of an insulated material, and may be implemented as an injection molding material, in consideration of productivity.

In addition, at least two stoppers (37) that are protruded so as to absorb impact energy of external impacts may be formed at an upper lateral surface of the holder member (30) by being spaced at a predetermined interval. The stopper (37) may be integrally formed with the holder member (30), or may be formed at the bobbin (40). Alternatively, the stopper (37) may not be formed at all.

In addition, the holder member (30) may be formed in a shape corresponding to that of an inner lateral surface of the cover member (50). Otherwise, the holder member (30) may form an external appearance of the lens actuating unit by being integrally formed with the cover member (50), without being separately provided.

Each of the magnets (33) may be formed in a size corresponding to each other. In addition, the magnets (33) facing each other may be arranged in mutual parallel position.

As illustrated in FIG. 2, the holder member (30) may be provided in a hexahedron shape, with its four surfaces formed in shapes of thin frames. In addition, upper and lower elastic members (44)(45) may be respectively installed at upper and lower portions of the holder member (30) to elastically support upward and downward motions of the bobbin (40) in an optical axis direction.

According to an exemplary embodiment of the present disclosure, a bottom surface of the holder member (30) may be coupled to the base (20), and an upper surface of the holder member (30) may be coupled to the cover member (50) (to be described hereinafter) at a fixed position. Here, the upper elastic member (44) may be interposed between the holder member (30) and the cover member (50), and the lower elastic member (45) may be interposed between the holder member (30) and the base (20).

The bobbin (40) may be installed in the internal space of the holder member (30) so as to be movable reciprocatingly in a direction parallel to the optical axis. The bobbin (40) may be installed with a coil unit (43) at an outer circumferential surface of the bobbin (40) so as to enable electromagnetic interaction with the magnet (33).

The bobbin (40) may include a lens barrel (42) installed inside with at least one lens (42a). As illustrated in FIG. 2, the lens barrel (42) may be formed to be capable of being screw-coupled to an internal side of the bobbin (40). However, the present disclosure is not limited hereto. Although not illustrated in the drawings, the lens barrel (42) may be directly coupled to the internal side of the bobbin (40) by means such as gluing except the screw coupling. Otherwise, the at least one lens (42a) may be integrally formed with the bobbin (40) without the lens barrel (42). The lens (42a) may be formed of a single lens, or may be composed of a plurality of lenses to form an optical system.

The bobbin (40) may be installed, at upper and lower portions thereof, with the upper and lower elastic members (44) (45), respectively. Each of the upper and lower elastic members (44) (45) may have one end thereof connected to the holder member (30) and another end thereof connected to the bobbin (40), respectively.

For example, as illustrated in FIG. 2, first and second protrusions (34a) (35a) for coupling the elastic members may be respectively formed at upper and lower portions of the holder member (30), and first and second protrusion accommodation hole (44a) (45a) may be respectively formed at positions corresponding to those of the first and second elastic members (44) (45), so that the upper and lower elastic members (44) (45) may be coupled to the holder member (30) via coupling of those protrusions and protrusion accommodation holes. In the same manner, the upper and lower elastic members (44) (45) may be coupled to the upper and lower portions of the bobbin (40) via such structure as described in the above.

According to such structure as described in the above, the upper and lower elastic member (44) (45) may elastically support the bobbin (40) while performing cantilever action with a fixed position of the holder member (30) as an axis, when the bobbin (40) performs reciprocating motions with respect to the optical axis direction.

Meanwhile, the coil unit (43) may be directly wound on an outer circumferential surface of the bobbin (40). Alternatively, the coil unit (43) may be provided as a ring-shaped coil block coupled by being inserted in an outer circumferential surface of the bobbin (40), as illustrated in FIG. 2. The coil unit (43) formed as a coil block may include a straight surface (43a) arranged at a position corresponding to that of the magnet (33) and a curved surface (43b) arranged at a position corresponding to that of the inner yoke (100) and the accommodation groove (200).

In addition, the bobbin (40) may include a first surface (40a) flatly formed at a surface corresponding to the straight surface (43a) and a second surface (40b) roundly formed at a surface corresponding the curved surface (43b), so that the coil unit (43) can be coupled to an outer circumferential surface of the bobbin (40). Here, the first surface (40a) may include a protruded portion (47) preventing the coil unit (43) from departing in an optical axis direction, so as to prevent the coil unit (43) from being departed from the installation position due to external impacts such as an impact that occur during the reciprocating motions of the bobbin (40).

In addition, the bobbin (40) may include a plurality of accommodation grooves (200) formed at a circumferential surface of the bobbin (40) and being spaced from the coil unit (43) at a predetermined interval to form a spaced portion. The inner yoke (100) formed at the cover member (50) may be inserted in the accommodation groove (200). The relationship between the inner yoke (100) and the accommodation groove (200) will be hereinafter described again.

The cover member (50) may be formed of a ferromagnetic body such as an iron, may be provided in a shape corresponding to that of the holder member (30), so as to cover the holder member (30). That is, as illustrated in FIGS. 1 to 4, when the holder member (30) is in a tetragonal shape, the cover member (50) may be also provided in a tetragonal shape.

The cover member (50) may be integrally formed with a plurality of inner yokes (100) formed at a position corresponding to that of the plurality of accommodation grooves (200). According to an exemplary embodiment of the present disclosure, one side surface of the inner yoke (100) may be spaced from the coil unit (43) at a predetermined interval, and another side surface of the inner yoke (100) may be spaced from the bobbin (40) at a predetermined interval. In addition, each of the inner yoke (100) and the accommodation groove (200) may be formed at four edge portions of the cover member (50) and the holder member (30), respectively.

As illustrated in FIGS. 2 and 3, the inner yoke (100) may be formed by being bent from an upper surface of the cover member (50) to an internal side in a direction parallel to the optical axis. A connection portion between the cover member (50) and the inner yoke (100) may be formed in a round shape, a slanted shape or a rectangularly bent shape.

The inner yoke (100) may include a pair of escape grooves (110) symmetrically formed at a position adjacent to that of the connection portion. The portion where the escape groove (110) is formed may form a bottleneck section. The bottleneck section where the escape groove (110) is formed may minimize interference between the inner yoke (100) and the bobbin (40) occurring when the bobbin (40) is being driven.

As illustrated in FIG. 3, a length (L1) of the escape groove (110) may be of 20-50% of an entire length (L2) of the inner yoke (100). The escape groove (110) may include a slanted surface (111) having a predetermined angle.

Due to forming of the slanted surface (111), the inner yoke (100) may have a width gradually being widened as approaching an end portion of the inner yoke (100). Here, a width of the end portion of the inner yoke (100) may be formed to be corresponding to a width of the accommodation groove (200), or may formed to be narrower than the width of the accommodation groove (200).

As illustrated in FIG. 3, the escape groove (110) may have a cutting width (w) in 0.1-0.5 mm with respect to a width direction of the inner yoke (100). However, the above numerical values are intended to be illustrative, and the present disclosure is not limited hereto. Therefore, the cutting width of the escape groove (110) may be modified according to variation in size of the camera module.

Referring to FIGS. 3 to 5, an entire length (L2) of the inner yoke (100) may be formed to be longer than a length (H1) from an upper surface of the cover member (30) to an upper surface of the coil unit (43). According to such structure, the inner yoke (100) may be inserted into an internal space of the accommodation groove (200), and may be arranged to be overlapped with the coil unit (43) at a predetermined length inside of the spaced portion formed between the coil unit (43) and the bobbin (40).

In addition, an entire length (L2) of the inner yoke may be provided to be 20-40% of an entire length (H) of the magnet (33). This is because, if the entire length (L2) of the inner yoke (100) is too short beyond the above-mentioned range, the electromagnetic efficiency declines, an interference with an upper portion of the coil unit (43) may occur during being driven, and foreign materials may be introduced in the gap therebetween. In addition, if the length (L2) of the inner yoke (100) is too long, the electromagnetic efficiency also declines, as well as the verticality and concentricity becomes difficult to manage, thereby the manufacturability is degraded.

In addition, a length (H2) of an end of the inner yoke (100) overlapped with the coil unit (43) by being inserted in the accommodation groove (200) may be formed to be longer than a backstroke distance of the bobbin (40). In such case, an upper end portion of the coil unit (43) may be arranged upper than the end of the inner yoke (100) at the lowest position during the reciprocating motions of the bobbin (40).

In addition, the end of the inner yoke (100) may be arranged, at the reference position, by being spaced from a bottom surface of the accommodation groove (200) at a predetermined interval. This is to avoid contact and interference between the end of the inner yoke (100) and the bottom surface of the accommodation groove (200) at the highest position during the reciprocating motions of the bobbin (40).

According to a first exemplary embodiment, as illustrated in FIG. 6, a surface of the inner yoke (100) facing the bobbin (40) may have a curvature corresponding to that of a virtual circle (a) concentric with the bobbin (40).

According to a second exemplary embodiment, a surface of the inner yoke (100) facing the bobbin (40) may be provided in a flat and straight shape, and the inner yokes (100) facing each other may be mutually parallel. Here, an angle ($\alpha$) formed by the surface of the inner yoke (100) facing the bobbin (40) and a lateral surface of the cover member (50) may be 45 degrees.

As described in the above, the inner yoke (100) integrally formed with the cover member (50) may be arranged at an internal side of the spaced portion formed by the accommodation groove (200) formed at an outer circumferential surface of the bobbin (40). Thereby, as illustrated in FIGS. 4 and 5, a structure to primarily collect foreign materials flowing down along the inner yoke (100) may be provided, so as to minimize introduction of foreign materials in the camera module.

In addition, an entire length (L2) of the inner yoke (100) may be formed to be 20-50% of an entire length (H) of the magnet (33), while the entire length (L2) of the inner yoke (100) may be formed to be longer than a length (H1) from an upper surface of the cover member (30) to an upper surface of the coil unit (43). Thereby, the electromagnetic efficiency of the camera module may be maximized, as well as the interference between each of components during upward and downward motions of the bobbin (40) may be minimized.

In addition, motions of both wing portions of the inner yoke (100) may be restricted in the spaced portion formed by an inner circumferential surface of the accommodation groove (200) and a surface of the coil unit (43) facing the bobbin (40). Thereby, the bobbin (40) may be prevented from rotating with respect to the optical axis direction due to an external impact or a malfunction, etc.

The abovementioned exemplary embodiments are intended to be illustrative, and not to limit the scope of the claims. Many alternatives, modifications, variations, and equivalents will be apparent to those skilled in the art. The features, structures, methods, and other characteristics of the exemplary embodiments described herein may be combined in various ways to obtain additional and/or alternative exemplary embodiments within an equivalent scope. Therefore, the technical scope of the rights for the present disclosure shall be decided by the appended claims and equivalents thereof.

What is claimed is:

1. A voice coil motor comprising:
   a cover member;
   a holder member disposed in the cover member;
   a bobbin disposed in the holder member and configured to move in a direction of an optical axis;
   a coil disposed on an outer lateral surface of the bobbin;
   a magnet disposed on the holder member and facing the coil;
   a base disposed below the bobbin; and
   an upper elastic member disposed in the cover member and comprising an inner portion coupled with an upper portion of the bobbin, an outer portion coupled with an upper portion of the holder member, and a middle portion connecting the outer portion and the inner portion of the upper elastic member;
   wherein the bobbin comprises a groove disposed on the outer lateral surface of the bobbin and forming a space between the bobbin and the coil,
   wherein the cover member comprises an upper wall formed with a hole, a lateral wall extending downward from the upper wall of the cover member, and an inner yoke extending downward from the upper wall of the cover member and disposed inside the lateral wall of the cover member;

wherein at least a portion of the inner yoke is disposed in the space between the bobbin and the coil, wherein the inner yoke comprises a first portion, a second portion disposed below the first portion, and a third portion connecting the first portion and the second portion and disposed between the first portion and the second portion;

wherein a horizontal width of the first portion of the inner yoke is shorter than a horizontal width of the second portion of the inner yoke, wherein the groove of the bobbin comprises a shape corresponding to a shape of the second portion of the inner yoke, wherein at least a portion of the second portion of the inner yoke is disposed in the groove, wherein the lateral wall of the cover member comprises a first lateral wall, a second lateral wall opposite to the first lateral wall, a third lateral wall and a fourth lateral wall disposed between the first lateral wall and the second lateral wall and being opposite to each other, wherein the holder member comprises a first pillar portion disposed on a first corner of the cover member between the first lateral wall and the third lateral wall, a second pillar portion disposed on a second corner of the cover member between the first lateral wall and the fourth lateral wall, a third pillar portion disposed on a third corner of the cover member between the second lateral wall and the third lateral wall, and a fourth pillar portion disposed on a fourth corner of the cover member between the second lateral wall and the fourth lateral wall, wherein the magnet comprises a first magnet disposed between the first pillar portion and the second pillar portion, and a second magnet disposed between the third pillar portion and the fourth pillar portion, wherein the first magnet is disposed at a position facing and corresponding to the first lateral wall and the second magnet is disposed at a position facing and corresponding to the second lateral wall, and wherein the first portion of the inner yoke is overlapped with a portion of the upper elastic member in a direction perpendicular to the direction of the optical axis.

2. The voice coil motor of claim 1, wherein the inner yoke comprises four inner yokes, and the groove of the bobbin comprises four grooves;

wherein each of the four inner yokes are disposed at a position corresponding to each of four corner portions of the cover member, wherein each of the four grooves is disposed at a position corresponding to each of the four inner yokes, and wherein the first magnet is disposed between the coil and the first lateral wall, and the second magnet is disposed between the coil and the second lateral wall.

3. The voice coil motor of claim 1, wherein the inner yoke further comprises:

a connection portion connecting the upper wall of the cover member and the first portion of the inner yoke, and wherein the connection portion is formed in any one of a round shape, a slanted shape, and a rectangularly bent shape.

4. The voice coil motor of claim 1, wherein a sum of the first portion and the third portion has a length (L1) of 20-50% of an entire length (L2) of the inner yoke in the direction of the optical axis.

5. The voice coil motor of claim 1, wherein a horizontal width of the third portion gradually increases from the first portion to the second portion.

6. The voice coil motor of claim 1, wherein an entire length (L2) of the inner yoke is longer than a length (H1) from the upper wall of the cover member to an upper surface of the coil in the direction of the optical axis, and wherein the entire length (L2) of the inner yoke is 20-40% of an entire length (H) of the magnet in the direction of the optical axis.

7. The voice coil motor of claim 1, wherein a top end of the coil is disposed higher than a bottom end of the inner yoke at the lowest position of the bobbin.

8. The voice coil motor of claim 1, wherein a surface of the inner yoke facing the coil comprises a curvature corresponding to that of the coil or a flat surface.

9. The voice coil motor of claim 8, wherein an angle ($\alpha$) between an imaginary surface extending from the surface of the inner yoke facing the coil and a surface of the lateral wall of the cover member meeting with the imaginary surface is an angle of 45 degrees.

10. The voice coil motor of claim 1, wherein the cover member comprises a ferromagnetic substance.

11. The voice coil motor of claim 1, further comprising:

a lower elastic member coupled with a lower portion of the bobbin, and wherein the coil has an octagonal shape, and wherein at least a portion of the first portion of the inner yoke is disposed at a position higher than an upper surface of the magnet.

12. The voice coil motor of claim 1, wherein the coil comprises:

a flat surface disposed at a position corresponding to that of the magnet, and a curved surface disposed at a position corresponding to that of the inner yoke, and wherein the bobbin comprises a flat surface disposed at a position corresponding to the flat surface of the coil and a curved surface disposed at a position corresponding the curved surface of the coil.

13. The voice coil motor of claim 5, wherein an angle between a lateral side of the first portion and a lateral side of the third portion meeting with the lateral side of the first portion forms an obtuse angle.

14. The voice coil motor of claim 1, wherein two grooves are defined by the first portion, the second portion, and the third portion of the inner yoke and the upper wall of the cover member; and wherein the two grooves of the inner yoke are symmetrically formed on both lateral sides of the inner yoke.

15. The voice coil motor of claim 1, wherein the horizontal width of the second portion of the inner yoke is shorter than a horizontal width of the groove of the bobbin or is corresponding to the horizontal width of the groove of the bobbin.

16. The voice coil motor of claim 1, wherein the second portion of the inner yoke is disposed in the groove of the bobbin such that the bobbin is configured to be inhibited from rotating with respect to the direction of the optical axis.

17. A camera module comprising:
the voice coil motor of claim 1;
a lens coupled to the bobbin of the voice coil motor;
a printed circuit board disposed below the base of the voice coil motor; and
an image sensor coupled to the printed circuit board.

18. The voice coil motor of claim 1, wherein the upper portion of the holder member is disposed between the magnet and the upper wall of the cover member, and
wherein the outer portion of the upper elastic member is disposed on an upper surface of the upper portion of the holder member.

19. A voice coil motor comprising:
a cover member comprising an upper wall formed with a hole, a lateral wall extending downward from the upper wall of the cover member, and an inner yoke extending downward from the upper wall of the cover member and disposed inside the lateral wall of the cover member;
a bobbin disposed in the cover member and configured to move in a direction of an optical axis;
a coil disposed on an outer lateral surface of the bobbin;
a magnet facing the coil and disposed between the cover member and the bobbin;
a base disposed below the bobbin and coupled with the lateral wall of the cover member; and
an upper elastic member disposed in the cover member and comprising an inner portion coupled with the bobbin, an outer portion disposed on an outside of the inner portion, and a middle portion connecting the outer portion and the inner portion of the upper elastic member;
wherein the bobbin comprises a groove disposed on the outer lateral surface of the bobbin and forming a space between the bobbin and the coil,
wherein at least a portion of the inner yoke is disposed in the space between the bobbin and the coil,
wherein the inner yoke comprises a first portion contacting with the upper wall of the cover member, a second portion disposed below the first portion, and a third portion connecting the first portion and the second portion and disposed between the first portion and the second portion;
wherein a horizontal width of the first portion of the inner yoke is shorter than a horizontal width of the second portion of the inner yoke,
wherein the groove of the bobbin comprises a shape corresponding to a shape of the second portion of the inner yoke,
wherein at least a portion of the second portion of the inner yoke is disposed in the groove,
wherein the lateral wall of the cover member comprises a first lateral wall, a second lateral wall opposite to the first lateral wall, a third lateral wall and a fourth lateral wall disposed between the first lateral wall and the second lateral wall and being opposite to each other,
wherein the holder member comprises a first pillar portion disposed on a first corner of the cover member between the first lateral wall and the third lateral wall, a second pillar portion disposed on a second corner of the cover member between the first lateral wall and the fourth lateral wall, a third pillar portion disposed on a third corner of the cover member between the second lateral wall and the third lateral wall, and a fourth pillar portion disposed on a fourth corner of the cover member between the second lateral wall and the fourth lateral wall,
wherein the magnet comprises a first magnet disposed between the first pillar portion and the second pillar portion, and a second magnet disposed between the third pillar portion and the fourth pillar portion,
wherein the first magnet is disposed at a position facing and corresponding to the first lateral wall and the second magnet is disposed at a position facing and corresponding to the second lateral wall, and
wherein at least a portion of the first portion of the inner yoke is disposed at a position higher than an upper surface of the magnet.

20. The voice coil motor of claim 19, wherein the magnet is spaced apart from the upper wall of the cover member,
wherein the outer portion of the upper elastic member is disposed between the magnet and the upper wall of the cover member, and
wherein the first portion of the inner yoke is overlapped with a portion of the upper elastic member in a direction perpendicular to the direction of the optical axis.

* * * * *